March 6, 1956 H. BLANCHETTE ET AL 2,737,368
CHURN
Filed Dec. 10, 1952 6 Sheets-Sheet 1

Inventors
Hilaire Blanchette
& Viateur Bolduc

Attorneys

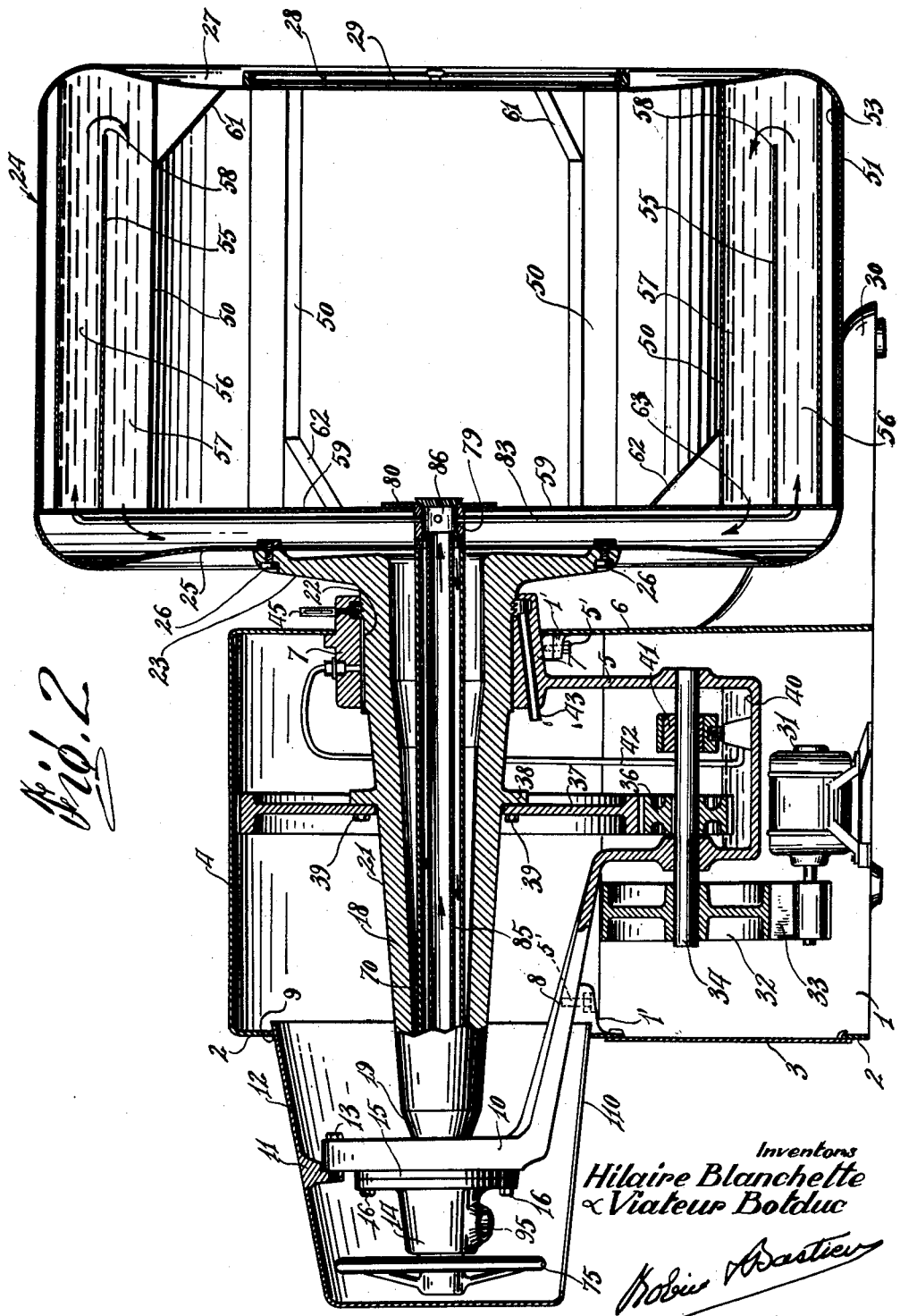

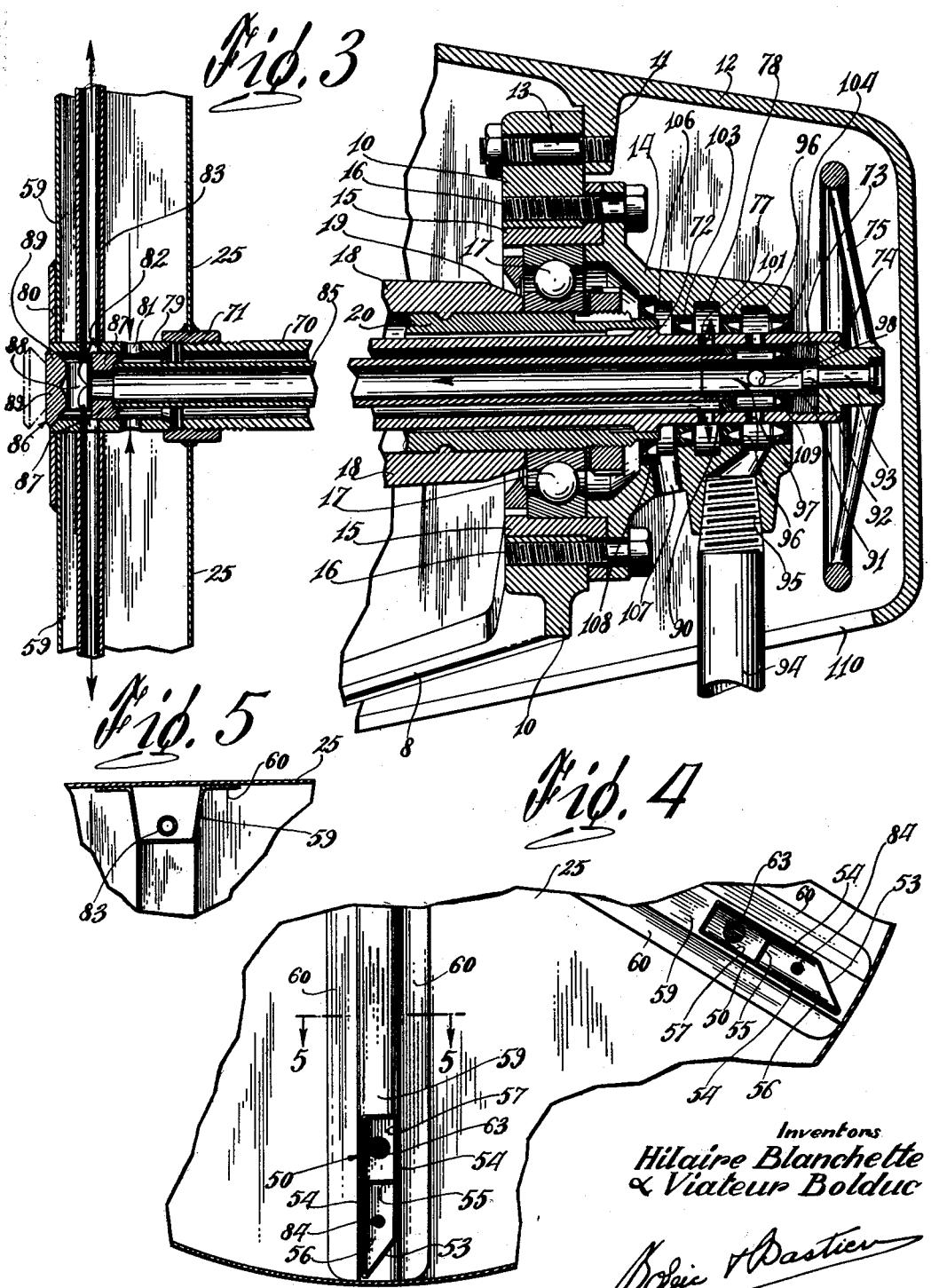

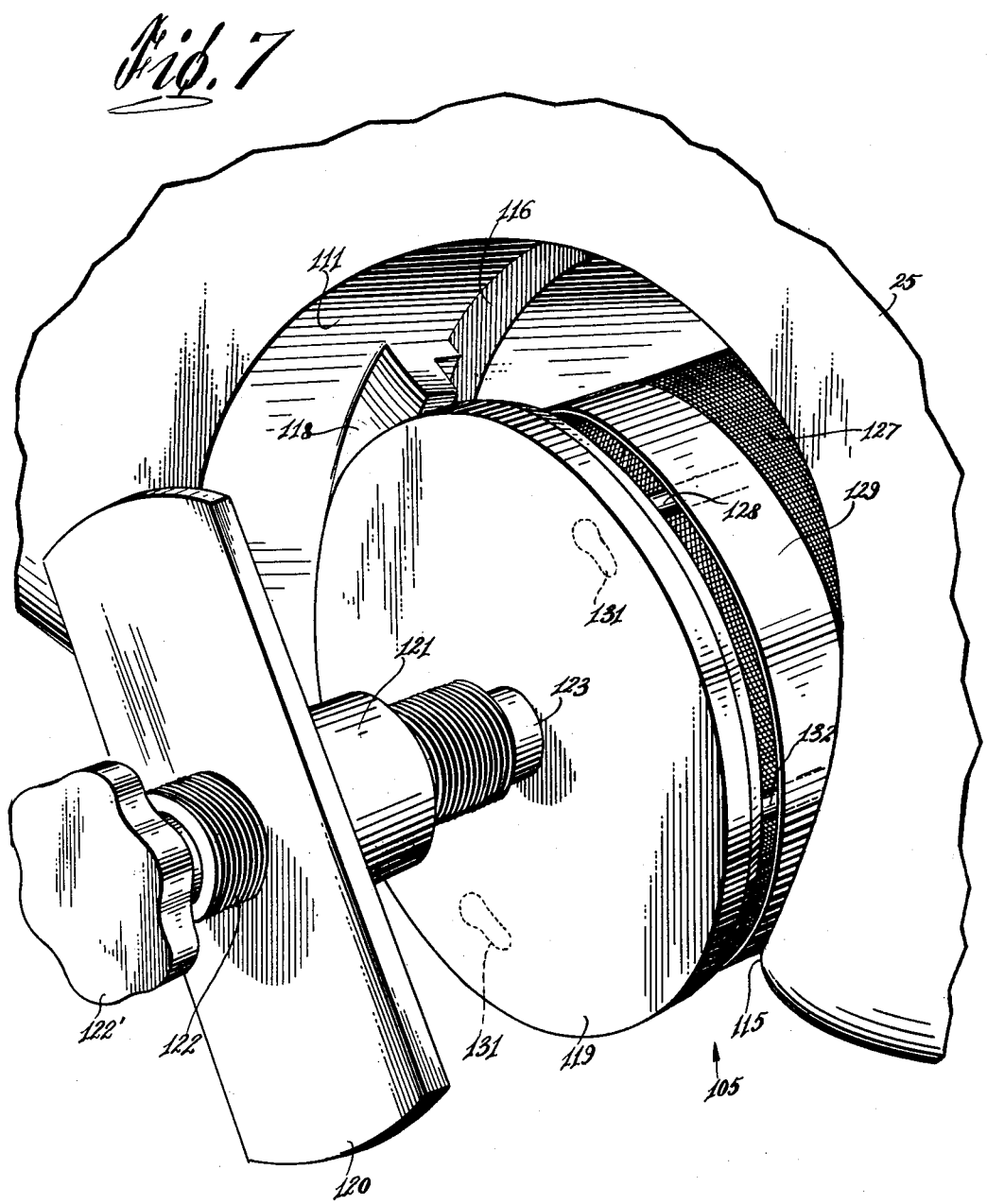

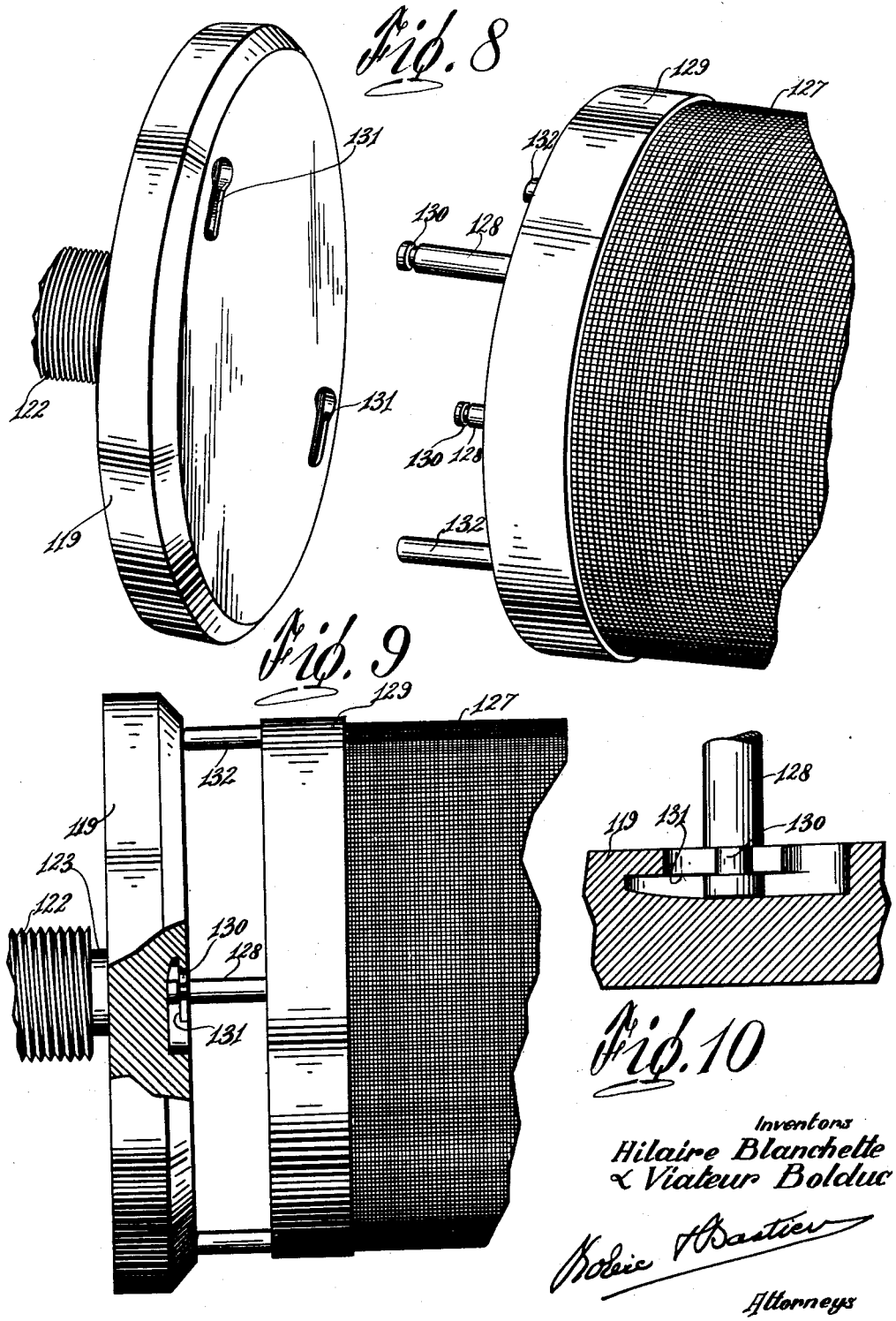

March 6, 1956  H. BLANCHETTE ET AL  2,737,368
CHURN
Filed Dec. 10, 1952  6 Sheets-Sheet 6
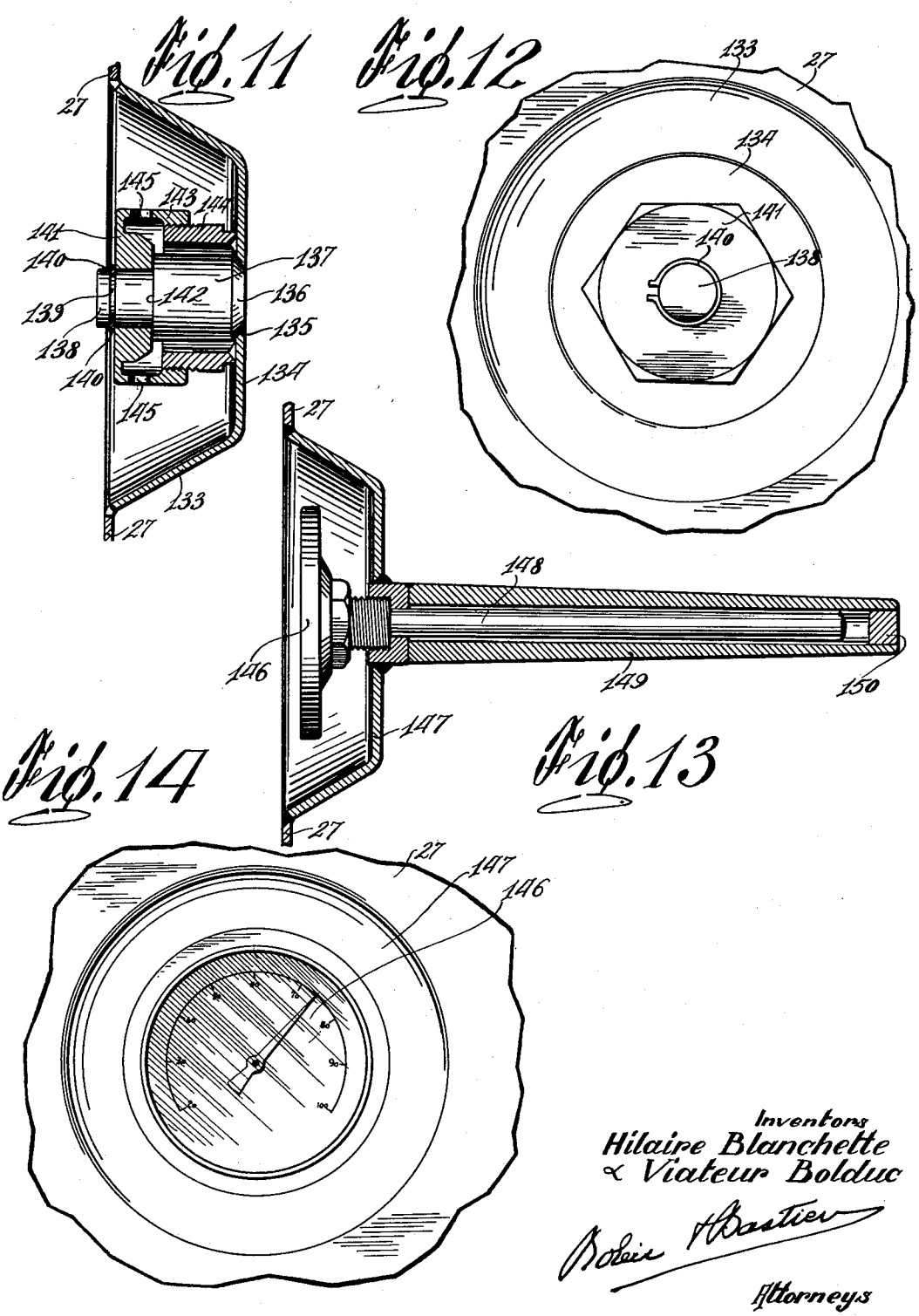
Inventors
Hilaire Blanchette
& Viateur Bolduc
Attorneys

United States Patent Office 2,737,368
Patented Mar. 6, 1956

2,737,368
CHURN

Hilaire Blanchette, St. Simon de Drummond, and Viateur Bolduc, Drummondville, Quebec, Canada, assignors to La Compagnie J. A. Gosselin, Limitee, Drummondville, Quebec, Canada Application December 10, 1952, Serial No. 325,172

2 Claims. (Cl. 257—89)

The present invention relates to machinery for making butter and more particularly to a combined churn and butter worker.

The general object of the present invention is the provision of a combined churn and butter worker having novel means for access within the churn drum, improved means for maintaining suitable temperatures for the cream during the churning operation and for the butter during the working operation, and novel means for thoroughly washing the butter in the drum or the churn drum itself when empty.

A more specific object of the present invention is the provision in a combined churn and butter worker of means, easily operable from an exteriorly controlled valve, which will alternately circulate water in the drum beaters in order to maintain the temperature of the cream or butter at the most suitable temperature for efficient churning and working, and inject water directly into the drum so as to thoroughly wash the same when empty or to wash the butter contained therein free from the buttermilk prior to working.

An important object of the present invention is the provision of a butter churn and worker in which the drum has a cylindrical shape and is supported only from one end thereof while its outer end is provided with a central circular manhole for easy access into the interior of said drum whatever be the angular position of the same.

Still another important object of the present invention is the provision in a combined churn and butter worker of an improved drain valve for drawing off the buttermilk and wash water after the churning operation while retaining the butter in the churn drum, said drain valve being easily and quickly removable from the drum for cleaning, repairs or other purposes.

Still another important object of the present invention is the provision of an improved air vent for the drum of a combined churn and butter worker of the type described.

Yet another important object of the present invention is the provision of a drum for a butter churn which is constructed of metal and provided with beaters so designed as to reinforce said drum.

Yet another important object of the present invention is the provision of a combined churn and butter worker which will give a prolonged and trouble-free service.

The foregoing and other important objects of the present invention will become more apparent during the following disclosure and by referring to the drawings in which:

Figure 2 is a longitudinal section of the same;

Figure 3 is a broken fractional longitudinal section of the same;

Figure 4 is a fractional elevation of the rear end wall of the churn drum showing the beaters in cross-section;

Figure 5 is a section along line 5—5 of Figure 4;

Figure 7 is a perspective view of said drain valve about to be removed from the churn drum;

Figure 8 is a perspective view of the drain valve plug and filter in disengaged position;

Figure 9 is a fractional elevation of the same elements in assembled position;

Figure 10 is a fractional sectional view of a bayonet joint used for securing the filter to the drain valve plug;

Figure 11 is a sectional elevation of the air vent provided for the churn drum;

Figure 12 is a plan view of the same;

Figure 13 is a longitudinal section of the thermometer assembly provided in the churn drum; and Figure 14 is a plan view of the same.

Figure 1:
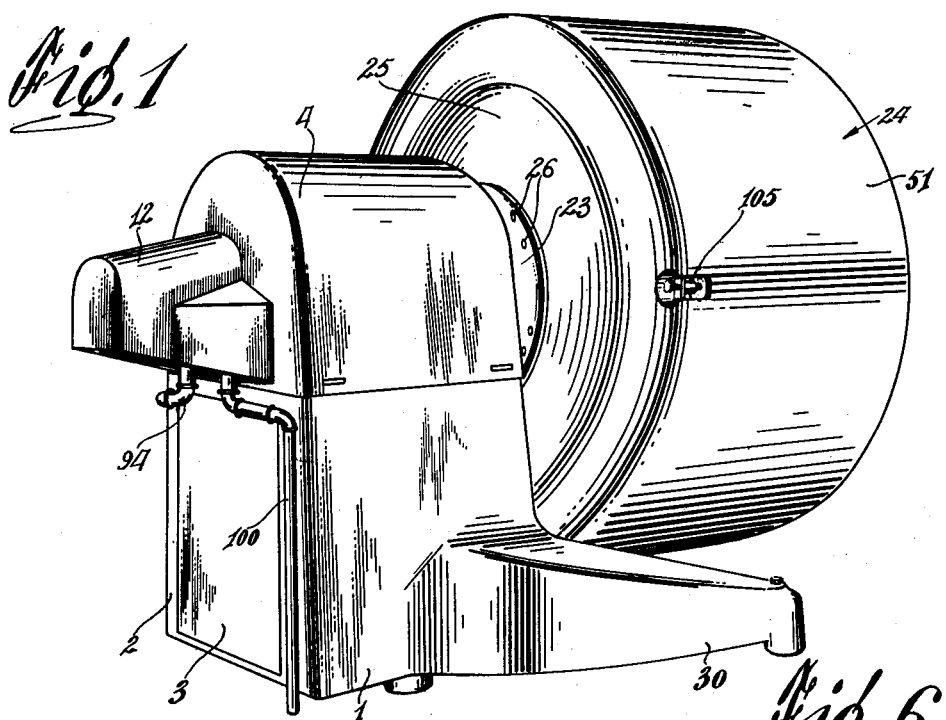
Figure 1 is a perspective rear end view of the churn according to the invention.
Figure 6:
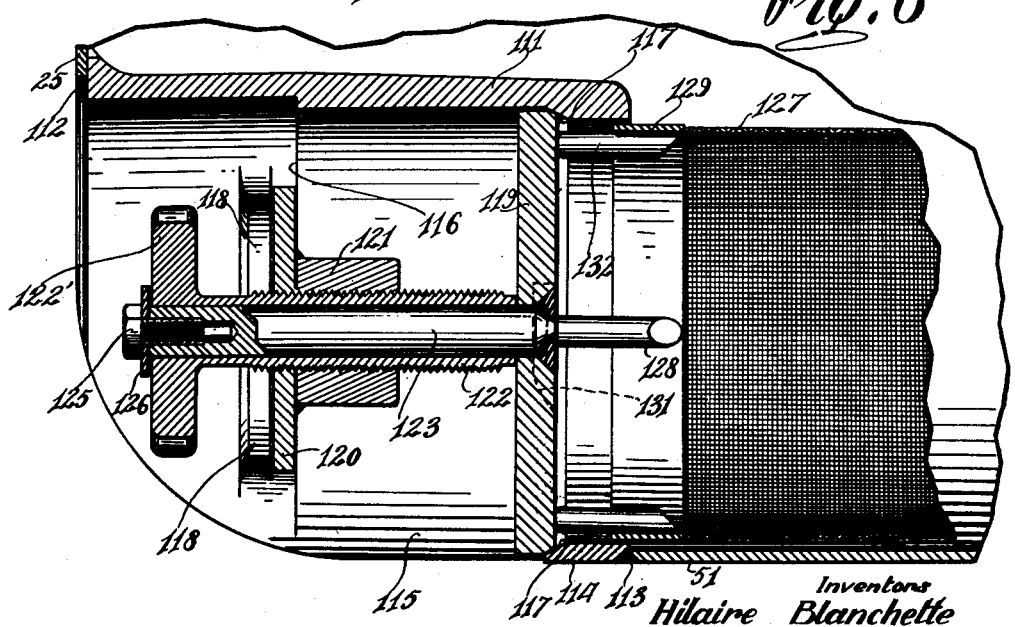
Figure 6 is a longitudinal section of the drain valve of the churn drum.

Referring now more particularly to the drawings in which like reference characters indicate like elements throughout, the numeral 1 denotes a base of substantially rectangular cross-section supporting and forming a housing for the driving mechanism of the churn. The rear face 2 of the base 1 is provided with an opening normally closed by a removable closure 3. The base 1 is surmounted by a hood 4 which is also removable. Said base supports an interior frame 5, shown more particularly in Figure 2, by means of corner brackets 1' and bolts 5'. A heavy duty bearing 7, the axis of which is horizontal, is mounted on the frame 5 and projects through the front face 6 of the base 1. The frame 5 is provided with a rearwardly extending yoke portion 8 passing through a rear opening 9 of the hood 4 and terminated by a vertical ring 10 coaxial with the bearing 7. A rearwardly extending hood 12 is rigidly supported by the ring 10 to which is secured, by means of a bolt 13, an inner projection 11 of said hood 4. The front portion of the hood 12 engages the opening 9 of the hood 4. A cover 14 and flanged bushing 15 are rigidly secured to the ring 10 by means of bolts 16. The ring 10 and bushing 15 support a ball bearing 17 as shown in Figure 3.

A hollow, horizontally disposed shaft 18 is journalled in bearings 7 and 17. Said shaft 18 has a tapering rear end portion 19 abutting against the ball bearing 17 and is provided with an inner cylindrical tubular extension 20 rigidly secured thereto and journalled in the ball bearing 17. The hollow shaft 18 has an intermediate portion 21 of conical shape which increases in diameter towards its front end, and a cylindrical portion 22 journalled in the bearing 7 and terminated at its front end by an outward radial flange 23.

The churn drum, generally indicated at 24, is made of metal and has a cylindrical shape. Its rear end wall 25 is slightly concave and is secured to the flange 23 of the hollow shaft 18 by means of bolts and nuts 26 in such a manner that the drum 24 will be coaxial with the shaft 18.

The front end wall 27 is also slightly concave and is provided with a central circular manhole 28 which may be closed by a quick acting hermetic closure 29 such as disclosed in our copending patent application #325,171 filed December 10, 1952 and now Patent No. 2,703,188 granted March 1, 1955.

From the above described arrangement, it is seen that the churn drum 24 is totally supported from its rear end by the shaft 18 and that the front end thereof is completely free of obstructions, whereby very easy access is provided to the interior of the drum through the manhole 28.

In order to firmly support the drum 24 and its load, the base 1 is provided with forwardly extending integral legs 30 terminating underneath and at the sides of the drum 24 opposite the middle portion thereof.

The shaft 18 and drum 24 are rotatively driven by means of the electric motor 31, shown in Figure 2, mounted in the bottom of the base 1 and driving the pulley 32 by means of the endless belt 33. The pulley 32 is keyed to a shaft 34 journalled in the bottom portion of the frame 5. A pinion 36 is keyed to the shaft 34 and meshes with a gear 37 rigidly secured by bolts 39 to a flange 38 depending from the conical portion 21 of the shaft 18. The bottom portion of the frame 5 forms an oil pan 40 into which dips the pinion 36. Thus said pinion 36 and gear 37 are well oiled at all times. An eccentric oil pump 41 is also mounted on the shaft 34 and feeds oil under pressure to the bearing 7 by means of pipe 42. Return of the oil is made through the drain pipe 43. As it is very important that the bearing 7 be kept lubricated at all times, a gauge 45 is mounted on top of the bearing 7 to provide an indication of the oil pressure within said bearing.

A switch, not shown, is mounted at a suitable location in front of the drum 24 to control the electric motor 31 in order to stop and start rotation of said drum.

Referring to Figures 2, 4 and 5, the drum 24 is provided with inner beaters 50 longitudinally extending in adjacent spaced relationship to the cylindrical wall 51 of said drum. Each beater 50 has a substantially rectangular cross-section with a bevelled outer longitudinal edge 53 and is mounted so that its side walls 54 extend radially of the drum 24. The front end of each beater 50 is directly secured to the front end wall 27. The beaters 50 are hollow and provided with a longitudinally extending middle partition 55 defining a lower chamber 56 and an upper chamber 57 in communication with each other at the front end of said beaters 50 as shown at 58. The rear end of the beaters 50 is closed by and rigidly secured to radially extending conduits 59 of substantially trapezoidal cross-section and having side flanges 60 rigidly secured to the rear end wall 25 of the drum 24. The conduits 59 converge toward the center of the circular end wall and are in communication with each other.

Alternate beaters 50 are provided at their front end with a triangular reinforcing member 61 secured to the inner edge of said beaters and to the front end wall 27 of the drum 24. The remaining beaters 50 are similarly provided with triangular reinforcing members 62 secured to the rear end wall 25 of the drum 24.

The churn, according to the invention, is provided with means to circulate water through the beaters 50 and to inject cleaning or washing water directly into the drum 24. These means will be described presently.

Referring to Figure 3, a return pipe 70 extends through the whole length of the hollow shaft 18 and its forward end threadably engages a sleeve 71 welded to the rear end wall 25 of the drum 24. The rear portion of the return pipe 70 is centered within the hollow shaft 18 by means of a depending rim 72 engaging the inner face of the rear end of the tubular extension 20. The rear end of the return pipe 70 projects from the cover 14 and is provided with inner threads 73 to engage the threaded shank 74 of a hand wheel 75. Moreover, the return pipe 70 is provided with a series of radial discharge openings 77 in alignment with an annular groove 78 made in the cover 14.

A nipple 79 is aligned with the forward end of the return pipe 70; it is secured to the sleeve 71 and extends through the converging ends of the conduits 59 which are covered by a disk 80.

The nipple 79 is provided with a first series of radial openings 81 in communication with each conduit 59, and with a second series of radial openings 82, each in communication with a pipe 83 extending in each of the conduits 59 and discharging into the lower chamber 56 of each beater 50 through an opening 84. The upper chamber of each beater 57 communicates with a conduit 59 through an opening 63.

A feed pipe 85 extends within the return pipe 70 and is coaxial therewith. The forward end of the feed pipe 85 is provided with a valve member 86 having an axially bored piston-like portion 87 in slidable contact with the inner face of the return pipe 70 intermediate the two series of openings 81 and 82. A transverse bore 88 is made in the valve member 86 forwardly of the piston like portion 87 to establish communication between the inner feed pipe 85 and the plurality of pipes 83 for feeding water to the lower chamber 56 of the beaters 50. The front portion 89 of the valve member 86 has a frustoconical shape adapted to seat against the bevelled forward end of the nipple 79 and close communication between the feed pipe 85 and the interior of the drum 24.

The rear end of the feed pipe 85 is centered within the return pipe 70 by means of a spacer ring 90 and said feed pipe 85 is extended rearwardly by means of an inner nipple 91 rotatively engaging the head 92 of a bolt 93 secured to the hand wheel 75 and extending within its shank 74.

Feed water is admitted to the churn by means of supply pipe 94 connected to an opening 95 made in the cover 14 and in communication with the feed pipe 85 through the annular groove 96, the radial openings 97 made in the return pipe 70 and the aligned radial openings 98 made in the nipple 91.

When the feed pipe 85 is in the position shown in full line in Figure 3, the water discharged therefrom passes through the transverse bore 88 of the valve member 86, the series of openings 82 and the pipes 83 to reach the lower chamber 56 of each beater 50. Said water will return through the upper chambers 57, the conduits 59, the openings 81, the return pipe 70 and finally through the series of openings 77 and the annular groove 78 to be discharged to the exterior by pipe 100, shown in Figure 1.

Upon rotation of the hand wheel 75, the inner feed pipe 85 will be displaced forwardly and, consequently, the valve member 86 will assume the position shown in dotted lines in Figure 3. In this position, the piston-like portion 87 closes the openings 81 thereby preventing water circulation through the beaters 50, and the feed water is discharged directly into the churn drum 24.

The feed water is discharged into the drum while the latter is rotating, thereby resulting in efficient cleaning of the drum or washing of the butter.

Mixing of the ingoing and outgoing water is prevented by means of the packing gland 101 disposed between the annular grooves 78 and 96 made in the cover 14, while escape of the circulating water to the exterior is prevented by the packing glands 103 and 104 disposed on the outer side of the said grooves 78 and 96. Any water which may leak through the packing gland 103 is collected within the internal annular grooves 106 and discharged to the exterior through the opening 107 made in cover 14. Additional packing glands 108 and 109 are also provided to prevent water from reaching the ball bearing 17 and from leaking around the hand wheel shank 74. The rear hood 12 is provided with a bottom opening 110 for easy access to the hand wheel 75 and to the connections of the pipes 94 and 100 to the cover 14.

The churn drum 24, according to the invention, is also provided with a drain valve, generally indicated at 105 in Figure 1, and more particularly shown in Figures 6 to 10 of the drawings. Part of the rear end wall 25 and cylindrical wall 51 is cut off at their junction and a cylindrical sleeve 111 is inserted in the cut off portion of said walls and welded at 112 to the end walls 27 at 113 to the cylindrical wall 51. The sleeve 111 is completely cylindrical at its inner end 114 and is provided with a slit 115 along its outer side. The inner wall of the sleeve 111 defines an inner shoulder 116 and a bevelled plug seat 117. Moreover, segmental lugs 118 project inwardly from said sleeve 111 in spaced relationship with the shoulder 116.

A plug disk 119 is adapted to abut the seat 117 for tightly closing the drum 24. A thrust plate 120 is adapted to removably engage the space between the lugs 118 and the shoulder 116 and supports an inwardly threaded sleeve 121 which receives an operating screw 122 provided at its outer end with an integral knob 122' and abutting the plug 119 at its inner end.

The operating screw 122 is rotatably mounted and encloses a spindle 123 welded at its inner end to the plug 119, as shown at 124, and threadedly receives at its outer end a bolt 125 retaining a washer 126 to prevent disengagement of the operating screw 122 from said spindle 123.

A wire mesh, or preferably a perforated metal, cylindrical filter screen, open at one end, is inserted within the drum 24 and is removably secured to the inner face of the plug 119 by means of two diametrically opposed longitudinally extending fingers 128 welded to the annular band 129 secured to one end of the cylindrical screen 127. The fingers 128 have a groove 130 at their outer end adapted to removably engage the bayonet slots 131 made in the inner face of the plug 119. Two additional spacer fingers 132 also diametrically opposed are secured to the band 129 and are adapted to abut against the inner face of the plug 119.

The operation of the drain valve described is as follows: To drain the wash water or the buttermilk from the drum, while retaining the butter clots therein, the knob 122' is rotated and displaces the plug 119 and screen 127 outwardly. The wash water or buttermilk will flow through the screen 127 and will be discharged to the exterior through the slit 115.

To remove the entire drain valve unit, the thrust plate 120 is rotated to disengage the lugs 118. The screen 127 may be detached from the plug 119 by a relative lateral displacement so that the finger 128 may be disengaged from the bayonet slots 131. The screen 127 may then be cleaned, repaired or replaced.

The drum 24 of the churn, according to the invention, is also provided with an air vent in order to allow the escape of gases which may be formed within the drum during the churning operation. This air vent is shown more particularly in Figures 11 and 12. It comprises a cup shaped member 133 welded around its periphery to the edge of a circular hole made in the front wall 27 of the drum 24. This cup shaped member 133 is provided at the center of its bottom wall 134 with a bevelled circular opening 135 and is normally closed by the tapered inner end 136 of the cylindrical valve member 137. Said valve member 137 is slidable in a sleeve 144 secured to the bottom wall 134, and has at its outer end a cylindrical extension 138 of smaller diameter than the body 137 and is provided at its free end with a groove 139 for receiving a spring clip 140 retaining a hexagonal cap 141 which abuts against the shoulder 142 and is provided with a cylindrical flange 143 having inner threads engaging the outer threads of the sleeve 144. Partial unscrewing of the cap 141 allows the gases to escape through the discharge openings 145 made in the flange 143 of the cap 141. This air vent is not automatic because it has been found that an automatically operated air vent is liable ot open while in a lower position during rotation of the drum 24 thereby discharging liquid as well as gases. This air vent is easily cleaned and may be taken apart by removing the spring clip 140.

Finally, the butter churn according to the invention is provided with a suitable thermometer to indicate the temperature of the materials inside the churn drum 24. A dial thermometer 146 of the bi-metal type is mounted in a cup-shaped member 147 welded to the edge of a circular hole made in the front end wall 27 of the drum 24. The shank 148 of the thermometer 146 is protected against damage by an outer sleeve 149 closed at its outer end 150 and welded to the cup-shaped member 147. In order to further protect the thermometer 146 against damage it is preferably located adjacent a beater 50.

The interior surfaces of the metal drum 24 may be treated by any known suitable process in order to prevent the butter from sticking to said surfaces.

From the foregoing description it will be apparent that the churn, according to the invention, possesses a number of advantages over butter churns known in the art.

Due to the fact that the churn drum 24 is mounted on the shaft 18 only through its rear end wall 25 and is completely free of obstruction at the front portion thereof, the manhole 28 may be located in the center of the front end wall 27 whereby said opening is always at the same easily accessible level in any angular position of the drum 24. This is important because the operator must have access to the interior of the drum several times during butter making.

Due to the fact that the beaters 50 are provided with a water circulation, the mixture of butter and liquid inside the drum may be kept at the most suitable temperature for churning or working; for example, during churning the temperature is maintained preferably at between 57° and 58° F., while during the working operation, the temperature is lowered to within the range of 52° to 54° F.

The churn according to the invention is also provided, as described previously, with very simple means for injecting cleaning water directly inside the drum in such a manner as to effect efficient cleaning of the drum walls or of the butter inside the same. These means consist of the valve member 86 which forms a cone-like water spray inside the drum and which is operated by the hand wheel 75. Because water circulation through the beaters 50 is cut off during the cleaning operation, a maximum water pressure is available.

Care has been taken to design the beaters 50 and the conduits 59 so as to reinforce the drum walls and thus achieve maximum strength.

Finally, the drain valve 110 is considered an important and novel arrangement: it closes the drum efficiently and may be quickly opened for filtering the mixture of materials in the drum, or bodily removed for completely draining the drum and for washing or changing the filtering screen 127.

While a preferred embodiment according to the present invention has been illustrated and described it is understood that various modifications may be resorted to without departing from the spirit and scope of the appended claims.

We claim:

1. A churn comprising a rotary drum having a cylindrical side wall and circular front and back end walls, said front end wall having a circular opening made therein, a cover for closing said circular opening, a hollow horizontal shaft rigidly secured to said back end wall and solely supporting said drum, at least two bearings rotatably supporting said shaft, a base for said bearings having legs extending underneath said drum, hollow beaters longitudinally extending within and secured to said drum between said end walls adjacent said cylindrical wall, conduits radially extending from the center of the back end wall and secured to the latter, longitudinal partitions in said beaters to define two chambers communicating at one end, a radial pipe extending in each of said conduits and discharging in one chamber of each beater, the other chamber of each beater communicating with said conduit, a liquid return pipe extending through the whole length of said hollow shaft having a first and second series of side openings respectively in communication with said conduits and with said radial pipes, and opening at its front end directly into said drum, said return pipe having apertures at its back end to allow discharge of liquid to the exterior, a liquid feed pipe coaxial with said return pipe and extending therein to a point short of the front end thereof, a valve member secured to the front end of said second pipe and having a cylindrical piston-like portion in contact with the inner walls of said first pipe and normally extending between said first and second series of openings, said valve member further including a frusto conical plug adapted to come in contact with the front open end of said return pipe to close communication between said feed pipe and the interior of said drum, and manually operable feed pipe displacing means connected to said feed pipe to longitudinally displace the same within said return pipe in order to cause said piston-like valve portion to cut off communication between said feed pipe and said radial pipes and to displace said frusto conical valve portion away from the front end of said return pipe to discharge liquid directly into said drum.

2. A churn as claimed in claim 1, further including a cover surrounding the rear ends of said feed and return pipes and secured to said base, said cover having annular inner grooves respectively registering with a third and fourth series of radial openings made at the rear end of said return pipe, said feed pipe having a series of openings made at its rear end and in communication with said fourth series of openings of said return pipe, bushing means extending in the annular space between said feed and return pipes and between said third and fourth series of openings of said return pipe, liquid feeding means and liquid discharging means respectively communicating with said annular grooves.

References Cited in the file of this patent

UNITED STATES PATENTS

| | | |
|---|---|---|
| 722,886 | Payne | Mar. 17, 1903 |
| 770,779 | Payne | Sept. 27, 1904 |
| 1,885,626 | Quaedvlieg | Nov. 1, 1932 |
| 2,118,421 | Steinmann | May 24, 1938 |
| 2,617,732 | Thorstensson-Rydberg | Nov. 11, 1952 |